BENJAMIN S. BURCH.
Improvement in Combination Tools.
No. 115,695.  Patented June 6, 1871.
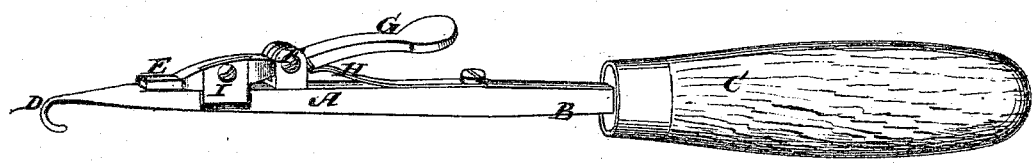

UNITED STATES PATENT OFFICE.

BENJAMIN S. BURCH, OF PETERSBURG, VIRGINIA, ASSIGNOR TO HIMSELF AND WILLIAM H. BAXTER, OF SAME PLACE.

IMPROVEMENT IN COMBINATION TOOLS.

Specification forming part of Letters Patent No. 115,695, dated June 6, 1871.

*To all whom it may concern:*

Be it known that I, BENJAMIN S. BURCH, of Petersburg, in the county of Dinwiddie and State of Virginia, have invented a new and Improved Combination Tool; and I do hereby declare that the following is a full, clear, and exact description thereof, which will enable others skilled in the art to make and use the same, reference being had to the accompanying drawing forming part of this specification.

This invention relates to a new implement for use with sewing-machines, which embraces in one tool a hook, a spring-nippers, and a shears, the hook being to take out or put in the shuttle and adjust the thread; the nippers being to take the end of the thread projecting through the eye in threading the needle to pull it through; also, to hold and adjust the needle in setting, and the shears being to cut threads, cloth, &c., all as hereinafter described.

The drawing represents a perspective view of my improved tool.

A is a long steel bar, having a shank, B, at one end, for inserting in a wood handle, or it may terminate in any preferred handle; and the other end terminates in a hook, D, suitable for engaging the shuttle of a sewing-machine for taking it out of or putting it in its place in the machine, the hook being adapted for engaging with any hole or opening in the shuttle. E is the nipper-jaw, pivoted in ears F, preferably to the side of the bar, opposite the one on which the hook is turned, and having a handle, G, or thumb-piece extending rearward from said pivot conveniently for opening by the thumb, while the handle C is held in the hand. H is a spring for closing the nipper-jaw. I is a shear-cutting blade, attached to the nipper-jaw between the nipping-point and the pivot, so as to work by the side of the shank A, against one corner of which it cuts when the nipper-jaw is forced down by the spring.

This cutting-blade may be either used in connecting with the other parts or not, as found best, and I propose to make the tools with or without it.

Beside the uses above enumerated, it is manifest the said tool will be found serviceable for other purposes.

Having thus described my invention, I claim as new and desire to secure by Letters Patent—

The herein-described improved tool, comprising in one implement the hook, nippers, and shears, or the hook and nippers only, all substantially as described.

B. S. BURCH.

Witnesses:
JNO. C. ARMISTEAD,
J. F. T. YOUNG.